(12) United States Patent
Clarke et al.

(10) Patent No.: US 7,467,873 B2
(45) Date of Patent: Dec. 23, 2008

(54) PRIVACY FILM

(75) Inventors: Graham M. Clarke, Woodbury, MN (US); Paul D. Graham, Woodbury, MN (US); Brent R. Hansen, New Richmond, WI (US); Travis B. Hoium, Moorhead, MN (US); David F. Slama, Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 103 days.

(21) Appl. No.: 11/250,676

(22) Filed: Oct. 14, 2005

(65) Prior Publication Data

US 2007/0087186 A1 Apr. 19, 2007

(51) Int. Cl.
G02B 27/00 (2006.01)

(52) U.S. Cl. .................. 359/601; 428/29; 428/167; 428/916; 283/72; 283/901; 283/902

(58) Field of Classification Search .................. 283/902
See application file for complete search history.

(56) References Cited

U.S. PATENT DOCUMENTS

| | | |
|---|---|---|
| 3,524,789 A | 8/1970 | Olsen |
| 3,689,346 A | 9/1972 | Rowland |
| 3,691,140 A | 9/1972 | Silver |
| 3,707,416 A | 12/1972 | Stevens |
| 3,857,731 A | 12/1974 | Merrill, Jr. et al. |
| 4,025,673 A * | 5/1977 | Reinnagel ............ 428/29 |
| 4,097,634 A | 6/1978 | Bergh |
| 4,166,152 A | 8/1979 | Baker et al. |
| 4,244,683 A | 1/1981 | Rowland |
| 4,495,318 A | 1/1985 | Howard |
| 4,536,362 A | 8/1985 | Donaldson |
| 4,576,850 A | 3/1986 | Martens |
| 4,578,298 A | 3/1986 | Nagafuchi |
| 4,601,861 A | 7/1986 | Pricone et al. |
| 4,684,593 A | 8/1987 | Wicker |
| 4,788,094 A | 11/1988 | Morita et al. |
| 4,894,060 A | 1/1990 | Nestegard |
| 4,984,060 A | 1/1991 | Ohmi et al. |
| 5,045,569 A | 9/1991 | Delgado |
| 5,073,457 A | 12/1991 | Blackwell |
| 5,134,198 A | 7/1992 | Stofko, Jr. et al. |
| 5,145,544 A | 9/1992 | Leseman et al. |

(Continued)

FOREIGN PATENT DOCUMENTS

JP 10-35087 2/1998

(Continued)

OTHER PUBLICATIONS

U.S. Appl. No. 11/251,166, filed Oct. 14, 2005.

*Primary Examiner*—Lee Fineman

(57) ABSTRACT

The present invention pertains to privacy film that can be used with documents. The privacy film has a light transmissive, polymeric base sheet that has opposing first and second surfaces. A plurality of light directing elements protrudes from the first surface of the base sheet. The base sheet can be constructed of a first polymeric material. The light directing elements can be constructed of a second polymeric material. The first and second polymeric material may be the same material. The light directing elements are substantially constant in its cross-section dimension and disposed substantially parallel to each other.

31 Claims, 3 Drawing Sheets

U.S. PATENT DOCUMENTS

| | | | |
|---|---|---|---|
| 5,175,030 A | 12/1992 | Lu et al. |
| 5,183,597 A | 2/1993 | Lu |
| 5,254,388 A | 10/1993 | Melby et al. |
| 5,290,068 A | 3/1994 | Gundjian |
| 5,301,981 A | 4/1994 | Nesis |
| 5,389,723 A | 2/1995 | Iqbal et al. |
| 5,431,644 A | 7/1995 | Sipinen et al. |
| 5,571,617 A | 11/1996 | Cooprider et al. |
| 5,663,241 A | 9/1997 | Takamatsu et al. |
| 5,714,237 A | 2/1998 | Cooprider et al. |
| 5,728,449 A | 3/1998 | Steininger et al. |
| 5,756,625 A | 5/1998 | Crandall et al. |
| 5,795,643 A | 8/1998 | Steininger et al. |
| 5,824,748 A | 10/1998 | Kesti et al. |
| 5,851,474 A | 12/1998 | Allan et al. |
| 5,858,139 A | 1/1999 | Ouderkirk et al. |
| 5,993,940 A | 11/1999 | Ouderkirk et al. |
| 6,033,516 A | 3/2000 | Steininger et al. |
| 6,151,526 A | 11/2000 | Tzviskos |
| 6,189,934 B1 | 2/2001 | Scruggs |
| 6,297,906 B1 | 10/2001 | Allen et al. |
| RE37,563 E | 2/2002 | Cooprider et al. |
| 6,367,128 B1 | 4/2002 | Galkiewicz et al. |
| 6,398,370 B1 | 6/2002 | Chiu et al. |
| 6,502,935 B1 | 1/2003 | Barcock et al. |
| 6,514,589 B1 | 2/2003 | Chang et al. |
| 6,806,310 B2 | 10/2004 | Kopolow et al. |
| 6,830,798 B2 | 12/2004 | Bowles et al. |
| 2003/0038924 A1* | 2/2003 | Veligdan et al. ............... 353/38 |
| 2004/0130788 A1* | 7/2004 | Minami ...................... 359/601 |
| 2004/0202822 A1 | 10/2004 | Bourdelais et al. |
| 2005/0027068 A1 | 2/2005 | Kopolow et al. |
| 2006/0012059 A1 | 1/2006 | Cheng et al. |

FOREIGN PATENT DOCUMENTS

| | | |
|---|---|---|
| JP | 2001-219681 | 8/2001 |
| JP | 2003-127494 | 5/2003 |
| KR | 2003-71565 | 9/2003 |
| KR | 2005-21016 | 3/2005 |
| WO | WO 99/17630 | 4/1999 |

* cited by examiner

PRIVACY FILM

CROSS REFERENCE TO RELATED APPLICATION

The present application is related to U.S. patent application having an 11/251,166 filed on even date herewith.

FIELD OF THE INVENTION

The present invention relates to a privacy film. In particular, the present invention relates to a polymeric based privacy film having a plurality of light directing elements each element being disposed substantially parallel to the next adjacent light directing element, the film being well suited for use with documents.

BACKGROUND

Products capable of providing privacy for the consumer have increased. For example, it is very common today for most personal computers and automatic teller machines to include a privacy screen allowing the user to view the image on the monitor while simultaneously limiting the view for bystanders, or at least those not in the viewing angle of the screen. Some have used light control films to provide privacy to a user who has documents containing sensitive material. The idea is similar in that the user can view the image on the document but bystanders are limited in viewing the document's content.

The art discloses various light control films that also serve the purpose of providing privacy to the user. However, as document privacy is becoming more and more of a desire for consumers, those skilled in the art seek different solutions to provide this desired feature. Thus, there is a continuing need for new privacy film constructions.

SUMMARY

The present invention provides for a privacy film that can be used with documents to limit the angle at which a viewer can read the information on the document. In particular, when the privacy film is placed in the use orientation such that the viewing angle is coincident with the user's line of sight, the user will be able to see the contents of the documents while others will only have a limited view of the document's content.

In one aspect, the present invention pertains to a privacy film comprising a light transmissive, polymeric base sheet comprising (i) a first polymeric material, the base sheet having opposing first and second surfaces; and (ii) a plurality of light directing elements comprising a second polymeric material, wherein each element has a base, a height h, and a minor axis disposed along the height, wherein the elements protrude from the first surface of the base sheet, and wherein each element is disposed such that the minor axis of one element is substantially parallel to the minor axis of the next adjacent element and the base of one element is not joined with the base of the next adjacent element. In another aspect, the privacy film comprises elongated light directing elements.

As used herein, the term "light transmissive" means the ability to transmit visible light. In one embodiment, the light transmissive base sheet has an opacity of 90 or less, as measured using a Lab Scan 6000 Tester with a HuterLab Master Color Data Program, commercially available from Hunter Associates Laboratory, Inc., Reston, Va. With reference to the light directing element, the term "elongated" generally means that the element has a rail-like appearance. The rails can be continuous along the entire length of the privacy film or they can be discontinuous. In one embodiment, the discontinuous light directing elements are discrete bodies having an appearance of a stem, such as, e.g., a stem of a mushroom.

One advantage of the present invention is that it provides the privacy feature with flexible construction that is relatively easy to manufacture. The privacy film can be quickly attached to the document in a non-permanent manner. Furthermore, the privacy film is durable so that it can be used repeatedly.

In this document, the term "about" is presumed to modify all numerical values.

BRIEF DESCRIPTION OF THE DRAWINGS

The invention can be better understood with reference to the following drawings, wherein.

These drawings are not drawn to scale and are intended only for illustrative purposes.

DETAILED DESCRIPTION

Figure 1:
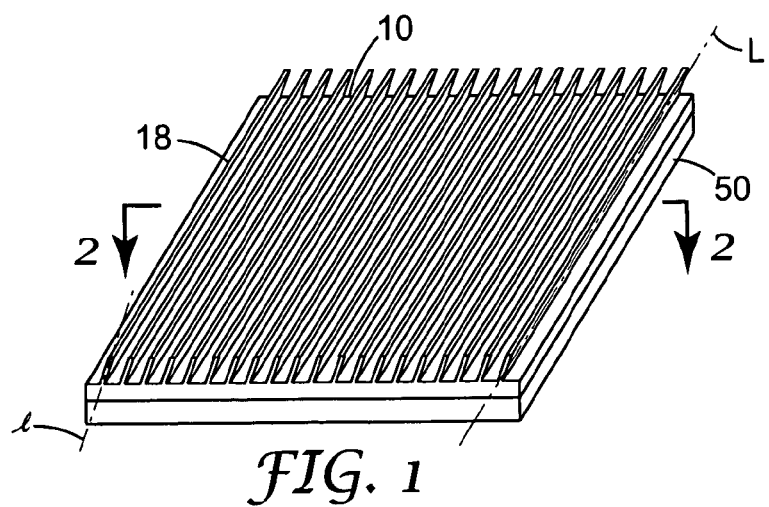
FIG. 1 is a perspective view of one embodiment of the present invention.

FIG. 1 is a perspective view of one exemplary embodiment of the present invention showing privacy film 10 having elongated light directing elements 18 disposed on substrate 50 that may contain sensitive information. In one embodiment, the privacy film can be attached using a light transmissive adhesive (not shown). The elements have a major axis L and a minor axis l. One exemplary substrate is a document bearing confidential information that the document owner wants limited viewing access.

In use the privacy film of the present invention is disposed on the document so that the major axis L lies substantially parallel to the image or lines of text on the document. For example, on 8 ½ by 11 inch paper, in portrait orientation where the text lies substantially parallel to the 8 ½ inch side of the paper, the privacy film would be oriented so that the major axis also lies along the same direction. The privacy film can be disposed on the document temporarily, meaning that the film can be removed from the substrate without damage thereto, or permanently, meaning that removal of the privacy film will most likely cause damage to the document. There exists a variety of means for attaching or disposing the privacy film to the document. For example, an adhesive can be used. The adhesive can be pressure sensitive or hot melt. The adhesive can be a repositionable adhesive, meaning that it can be applied and removed from the substrate multiple times without damage to the substrate and without significant loss in adhesion of the repositionable adhesive. In another application, the privacy film is formed as a pocket, where a first privacy film forms a front of the pocket and a polymeric backing or a second privacy film forms a back of the pocket. Both the front and back of the pockets have generally the same dimensions and geometry, such as e.g., a 9 inch by 11.5 inch rectangle. The front and the back are attached on three sides, leaving the fourth, typically top side, open for insertion and removal of a document. Other configurations can be used.

The light directing elements interfere with light transmission thereby providing the privacy feature of the present inventive film. Optically active materials, such as light reflecting and or light absorbing materials, may be included. The light directing elements geometry, spacing, and the optically active materials are discussed below in detail.

Figure 3:
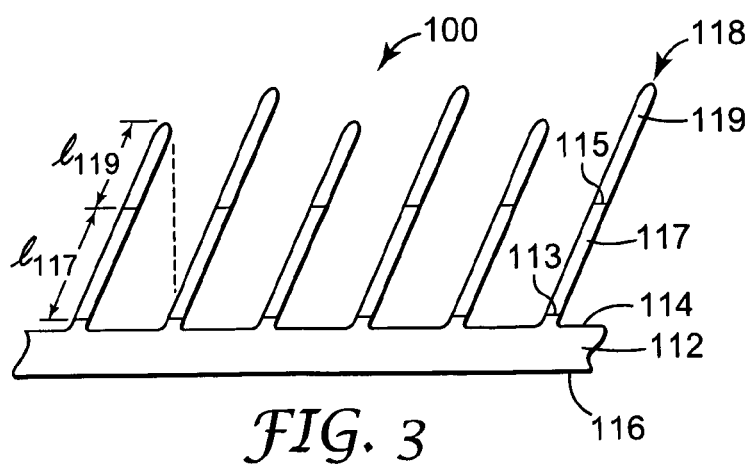
FIG. 3 is a cross-sectional view of another embodiment of the present invention showing light directing elements with multiple sections.

In one exemplary embodiment, the heights of the light directing elements are substantially the same on the privacy film. There may be some variation in the elements' heights due to the manufacturing conditions. In another exemplary embodiment, the heights of the elements vary from one region of the privacy film to another region and even from one element to the next adjacent element. By variation in height, it is generally meant that one element will be from 75% to 95% in height of another element. FIG. 3 generally illustrates the embodiment having light reflecting elements with varying heights.

Figure 2:
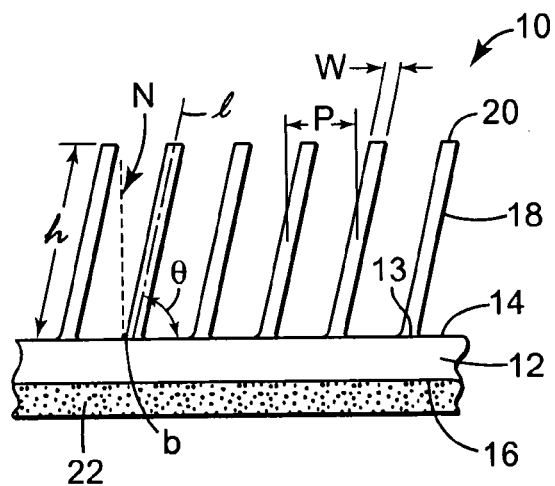
FIG. 2 is a cross-sectional view of the privacy film of FIG. 1 taken along line 2-2.

FIG. 2 shows a cross-section of the privacy film in FIG. 1 taken along line 2-2. The privacy film includes base sheet 12 having opposing first surface 14 and second surface 16 and demarcation line 13. Light directing elements 18 protrude from the first surface of the base sheet. While FIG. 2 shows that demarcation line 13 is collinear with first surface 14, the line can be at a different location. Each light directing element has a height h, a width W, and a center-to-center spacing from one element to the next adjacent element P. The height h is measured along the minor axis l from the first surface 14 of the base sheet to tip 20. The width W is measured perpendicular to the minor axis.

In one exemplary embodiment the h to P ratio (h:P) is greater than 0.5. In another embodiment, the h:P ratio is less than 5. In one embodiment, the width of the light directing element, as measured proximate to the first surface of the base sheet is greater than 25 microns. In another embodiment, the width is less than 750 microns. In the embodiment of FIG. 2, the light directing elements are disposed on the base sheet at a cant angle θ. The cant angle is the angle between first surface 14 and the minor axis of each light directing element. In one embodiment, the cant angle is greater than 15°. In another embodiment, the cant angle is less than 90°. In yet another embodiment, the cant angle ranges from 40° to 85°. In yet another embodiment, the cant angle ranges from 55° to 75°. If desired, adhesive 22 is provided on the second surface of the base sheet, for attachment to a substrate. While the light directing elements of this particular embodiment are substantially uniform in its cross-sectional dimension, there can be a slight draft (i.e., a slight narrowing) to the elements towards tip 20. Also, as shown in FIG. 2, the placement of two adjacent light directing elements is such that the tip of one element, taken along an imaginary line normal to the first surface of the base sheet (shown as dotted line N), lies next to the base (shown as reference letter b) of the next element. Other placement configurations can be used, so long as the light directing elements provide the privacy feature and provided that the h:P ratio falls within the established range. In this particular embodiment, the light directing element includes either light absorbing materials or light reflecting materials.

Suitable light reflecting materials include, e.g., titanium dioxide, zinc oxide, zinc sulfide, zinc phosphate, calcium carbonate, alumina, silica, antimony oxide, barium sulfate, lithopene (a co-precipitate of barium sulfate and zinc oxide), calcined kaolin, lead carbonate, magnesium oxide, and combinations thereof. Suitable light absorbing materials include, e.g., carbon black, spinal black, retile black, iron black, and combinations thereof. When a light reflecting material is used, 1 to 50 parts by weight, based on 100 parts by weight total, is added to the polymer resin to form the light directing elements. In some embodiments, 1 to 15 parts by weight is used. In other embodiments, 2 to 10 parts by weight is used. When a light absorbing material is used, 0.1 to 50 parts by weight, based on 100 parts by weight total, is added to the polymer resin to form the light directing elements. In some embodiments 1 to 15 parts by weight of light absorbing material is used. In other embodiments, 1 to 5 parts by weight is used. A combination of light reflecting material and light absorbing material can be used to form an individual light directing element, as further discussed below. In other embodiments, color pigments, fluorescent colors, and glitter can be added to the light directing elements.

FIG. 3 shows a cross-sectional view of another embodiment of the invention, where privacy film 100 includes base sheet 112 having opposing first surface 114 and second surface 116. Light directing elements 118 protrude from the first surface of the base sheet. Demarcation line 113 resides slightly within the light directing element. In this particular embodiment, the light directing element include first portion 119 disposed distal to the first surface of the base sheet, second portion 117 disposed proximate to the first surface, and third portion from the first surface to line 113. In some embodiments, the composition of the base sheet and the third portion will be similar, and may even be the same. Line 115 demarcates the first portion from the second portion. The first portion includes a light absorbing material and the second portion includes a light reflecting material. The height of the first portion is denoted as 119, and is the distance along the minor axis of the element between line 115 and the tip. The height of the second portion is denoted as $l_{117}$ and is the distance along the minor axis of the element between line 113 and 115. In one embodiment, the ratio of $l_{119}$ to $l_{117}$ is 3 to 0.1. The placement of two adjacent light directing elements is such that the tip of one element, taken along imaginary line N overlaps with the base of the next adjacent element. While the light directing element of FIG. 2 includes a tip that is has substantially straight edges, the tips can be rounded as shown in FIG. 3. Other geometry can be used, so long as the light directing elements interfere with light transmission so as to provide the privacy feature.

Figure 4:
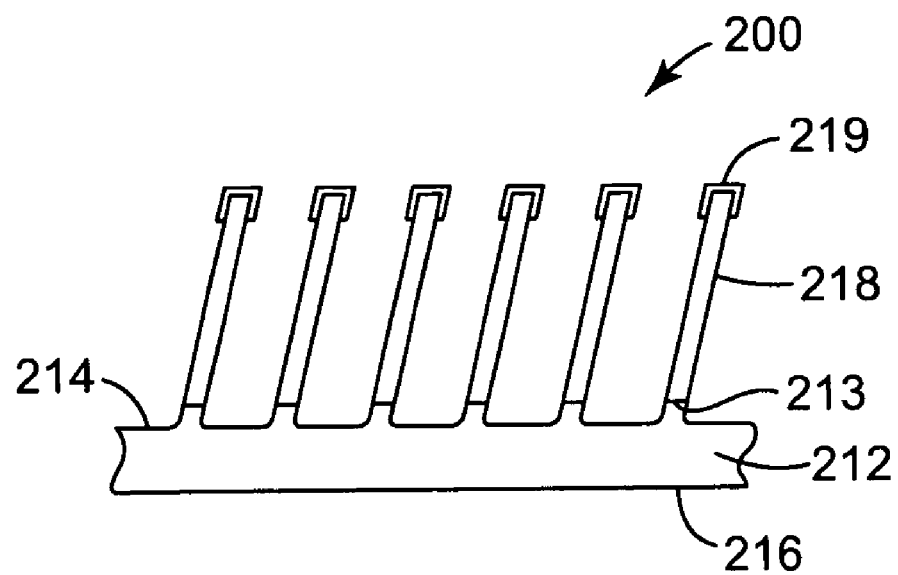
FIG. 4 is a cross-sectional view of another embodiment of the present invention, showing the tip portions of the light directing elements being covered with a light absorbing coating.

FIG. 4 shows a cross-sectional view of another embodiment of the present invention where privacy film 200 includes base sheet 212 having opposing first surface 214, second surface 216, and demarcation line 213. Light directing elements 218 protrude from the first surface. At the tips of the light directing elements, light absorbing coating 219 has been applied. The coating may migrate down the sides of the light directing elements. In this particular embodiment, the light directing element could include light reflecting materials. The coating can be applied to the elements using known coating techniques. In one embodiment, the coating is 0.01 to 1.0 mm in dry thickness. In one embodiment, the light absorbing coating is applied to the tips using digital printing methods, such as inkjet printing, color inkjet printing, laser printing, and dye or mass transfer printing or by conventional printing techniques, such as offset lithography, flexography, and gravure. The tips of the elements are receptive to the ink or the dyes used in the printing process.

Figure 5:
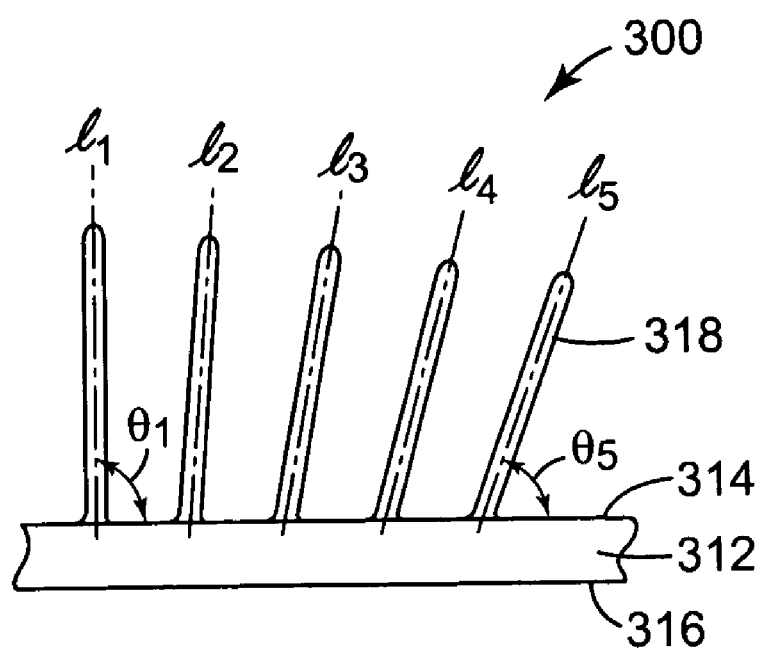
FIG. 5 is a cross-sectional view of another embodiment of the present invention showing light directing elements at varying cant angles.

FIG. 5 shows a cross-sectional view of another embodiment of the present invention, where privacy film 300 includes base sheet 312 having opposing first surface 314 and second surface 316. Light directing elements 318 protrude from the first surface of the base sheet. For ease of understanding, only the cross-sections of five light directing elements are shown. In this particular embodiment, the cant angle of each light directing element differs from the next adjacent element. For example, cant angle $\theta_1$ will be similar to cant angle $\theta_2$. For example, $\theta_1$ may be 90° while $\theta_1$ may be 88°. Thus, these two light directing elements will be substantially parallel to one another. The cant angle for the fifth light directing element, $\theta_5$, however, may be very different than that of the first light directing element. In this figure, if $\theta_1$ is 90°, $\theta_5$ may be 60°, so that the first light directing element will not be considered to be parallel to the fifth light directing element. The magnitude of the varying change in cant angles has been exaggerated in this figure to illustrate the varying cant angles.

Figure 6:
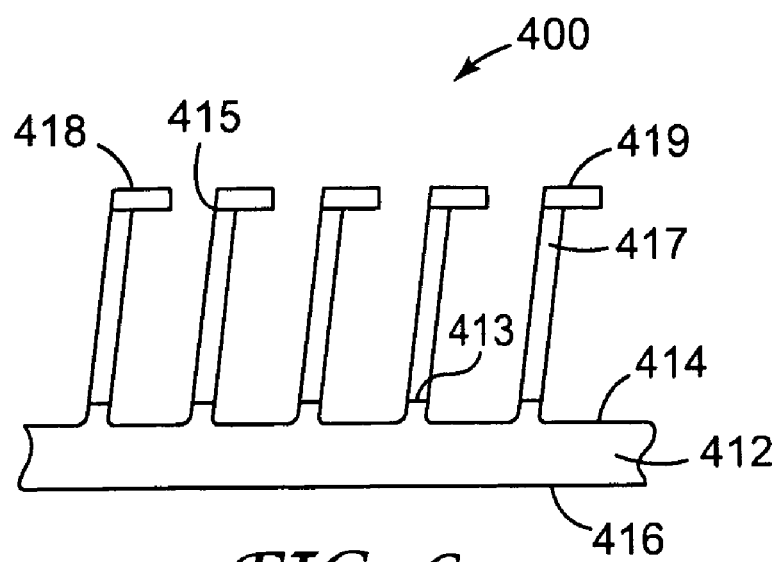
FIG. 6 is a cross-section view of another embodiment of the present invention showing the tip portions of the light directing elements being elongated in a direction parallel to the base layer.

FIG. 6 shows a cross-sectional view of yet another embodiment of the present invention, where privacy film 400 includes base sheet 412 having opposing first surface 414, second surface 416 and demarcation line 413. Light directing elements 418 protrude from the first surface. Each light directing element has first portion 419 distal to the first surface of the base sheet and second portion 417 proximate to the first surface. Line 415 demarcates the first portion from the second portion. Line 413 demarcates the second portion from a third portion. The first portion has one-sided extension, similar to an upside down "L". The extensions can all be on the same side, e.g., all left facing or all right facing (as shown in the figure), or they can alternate between left facing and right facing. The extensions can also be randomly oriented to the left or to the right or at any angle between the left and the right side. In other words, if one were to take a top view of the embodiment of FIG. 6 so that all that would be seen is first portion 419, it can be rotated at any of the various angles along a 360° path. In one embodiment, at least one of the first and second portion includes light reflecting materials. In another embodiment, the first portion includes light absorbing materials and the second portion includes light reflecting materials. In yet another embodiment, a combination of different light directing elements, such as, e.g., the elements shown in FIGS. 2, 3, and 6 are used together to form a privacy film.

Figure 7:
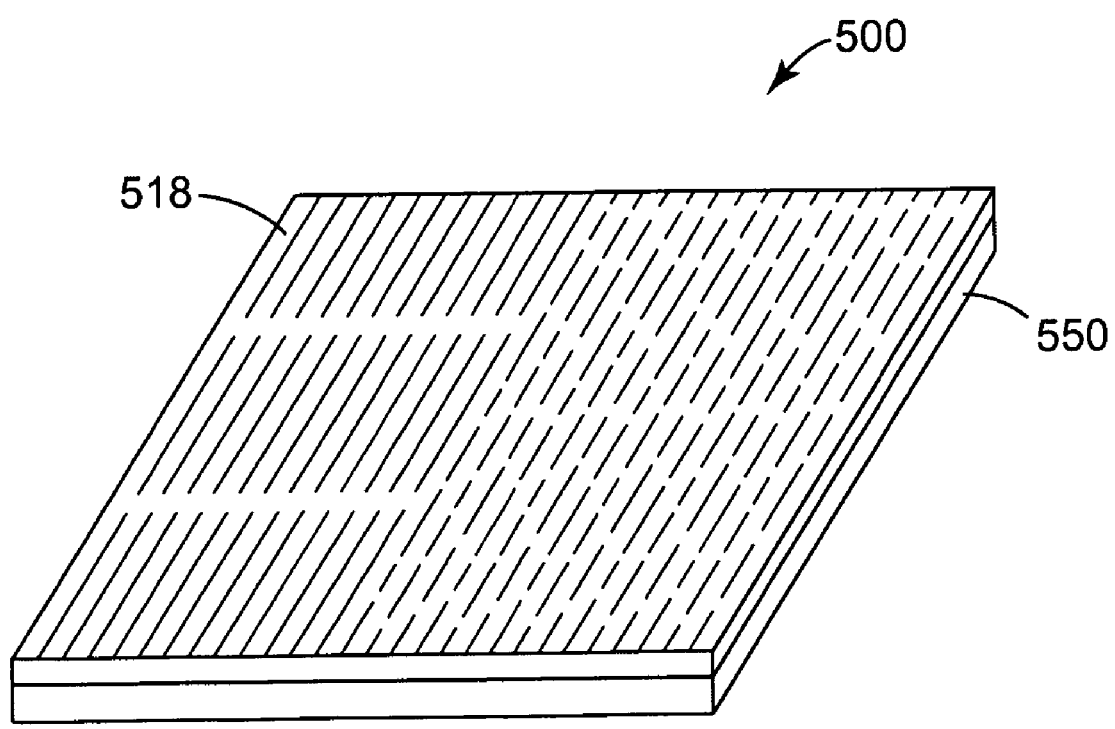
FIG. 7 is a perspective of another embodiment of the present invention showing a combination of elongated light directing elements.

FIG. 1 shows the light directing elements as elongated rails that run continuously along the length of a document. In other embodiments, the elements can include interruptions, either of a specified length to create uniform interruptions, or of a random length to create non-uniform interruptions. Among all the various elements, there could be light directing elements that are continuous over the length of the entire substrate. For example, FIG. 7 shows an illustrative privacy film 500 disposed on substrate 550. The privacy film includes light directing elements 518 having uniform interruptions on the left hand side and non-uniform interruptions on the right hand side. Interspersed in between are light directing elements that are continuous over the entire length of the film.

While the base sheet in all of the embodiments is light transmissive, it may include light reflecting materials. The quantity of light reflecting materials used in the base sheet can, but does not have to, be similar to that used in the light directing elements. The advantage of using similar amounts is that the process of making the privacy film, as further described below, can be simplified to using a single extruder instead of multiple extruders. In the case where substantially the same amount is used, care should be taken to select a sufficient amount to impart the privacy feature to the film without adversely affecting the readability of the underlying document.

The inventive light directing element can be made in various ways. In one exemplary method, the privacy film of the present invention can be formed by extruding a polymeric web through a die having an opening cut, for example, by electron discharge machining. The web would include the base sheet and the light directing elements disposed thereon.

The shape of the die opening is designed to generate a web with a desired cross-sectional shape or profile. The web can be quenched after leaving the die opening by pulling it through a quenching material such as water. A wetting agent may be added to the quenching medium to wet the entire surface of the extruded web, including spaces between the light directing elements. The extruded web may be further processed, e.g., by applying a light absorbing coating to the tips of the elements (as shown in FIG. 4) or by cutting the extruded elements and stretching the web to form discontinuous light directing elements.

When the inventive privacy film contains multiple different layers, as when the base sheet and the light directing elements are of different materials or as when the light directing elements contain multiple sections (see, e.g., FIGS. 3 and 6), the film can be formed by co extrusion techniques as described, e.g., in PCT application WO 99/17630. The coextrusion technique may involve passing different melt streams from different extruders into a multiple-manifold die or multiple-layer feed block and a film die. The individual streams merge in the feed block and enter the die as a layered stack that flows out into layered sheets as the material leaves the die.

Suitable materials for use in forming the privacy film include thermoplastic polymers and elastomers. Suitable thermoplastic polymers include, e.g., polyolefins such as polypropylene or polyethylene, polystyrene, polycarbonate, polymethyl methacrylate, ethylene vinyl acetate copolymers, acrylate-modified ethylene vinyl acetate polymers, ethylene acrylic acid copolymers, nylon, polyvinylchloride, and engineering polymers such as polyketones or polymethylpentanes. Suitable elastomers include, e.g., natural or synthetic rubber, styrene block copolymers containing isoprene, butadiene, or ethylene (butylene) blocks, metallocene-catalyzed polyolefins, polyurethane, and polydiorganosiloxanes. Mixtures of thermoplastic polymers and elastomers may also be used.

EXAMPLES

In the following examples, all weights are expressed as parts by weight. The light directing elements were extruded using a Davis-Standard 2.5 inch single screw extruder (SSE) and or 0.75 inch Killion SSE and the base sheet was extruded using a Davis-Standard 1.5 inch SSE. The components used are listed in Table 1

TABLE 1

| Material | Description | Source |
| --- | --- | --- |
| BASELL PRO-FAX 7523 | medium impact polypropylene copolymer resin | Basell USA, Inc. Elkton, MD |
| CLARIANT white pigment concentrate | 50/50 blend of titanium dioxide and polypropylene, trade designation 1015100S | Clariant Materbatches Holden, MA |

TABLE 1-continued

| Material | Description | Source |
|---|---|---|
| black pigment concentrate | 40/60 blend of carbon black and polypropylene, product code CC0003843060 | PolyOne Corporation Avon Lake, OH |
| Wetting agent | polyoxyethylene castor oil, trade designation Ethox Co-40 | Ethox Chemicals, LLC Greenville, SC |

Example 1

To the hopper of the Davis Standard 2.5 inch SSE hopper was added 92 parts BASELL PRO-FAX 7523 polypropylene resin and 8 parts CLARIANT white pigment concentrate. To the hopper of the Davis-Standard 1.5 inch SSE hopper was added BASELL PRO-FAX 7523 polypropylene resin. The 2.5 SSE was running at a speed of 15 revolutions per minute (RPM) and the 1.5 SSE was running at a speed of 23 RPM. The coextruded web emerged from the die through a shaped exit orifice and was subsequently quenched in a water bath, containing 1% wetting agent, having an actual water temperature of 80° F.

The resulting privacy film was cut in the cross-web direction with a razor blade. With the use of optical microscopy, it was determined that the base sheet was 74 micrometer thick. The light directing elements had a center-to-center spacing of 345 micrometer, a height of 605 micrometer, a width of 120 micrometer, and a cant angle of 70°. Almost the entire length of the light directing elements consisted essentially of a blend of 92 parts BASELL PRO-FAX 7523 and 8 parts CLARIANT white pigment concentrate, and that the base layer consisted essentially of BASELL PRO-FAX 7523.

Example 2

To the hopper of the Davis-Standard 2.5 inch SSE hopper was added 70 parts BASELL PRO-FAX 7523 polypropylene resin and 30 parts CLARIANT white pigment concentrate. To the hopper of the Davis-Standard 1.5 inch SSE hopper was 70 parts BASELL PRO-FAX 7523 polypropylene resin and 30 parts CLARIANT white pigment concentrate. To the hopper of a Killion 0.75 inch SSE was added BASELL PRO-FAX 7523 polypropylene resin. The 2.5 SSE was running at a speed of 13 RPM, the 1.5 inch SSE was running at a speed of 11 RPM and the 0.75 inch SSE was running at a speed of 50 RPM. The coextruded web emerged from the die through a shaped exit orifice and was subsequently quenched in a water bath, containing 1% wetting agent, having an actual water temperature of 83° F.

The resulting privacy film was cut in the cross-web direction with a razor blade. With the use of optical microscopy, it was determined that the base sheet was 90 micrometer thick. The light directing elements had a center-to-center spacing of 360 micrometer, a height of 700 micrometer, a width of 120 micrometer, and a cant angle of 54°. Almost the entire length of the light directing elements consisted essentially of a blend of 70 parts BASELL PRO-FAX 7523 and 30 parts CLARIANT white pigment concentrate, and that the base layer consisted essentially of BASELL PRO-FAX 7523.

Example 3

To the hopper of the Davis-Standard 2.5 inch SSE hopper was added 96 parts BASELL PRO-FAX 7523 polypropylene resin and 4 parts black pigment concentrate. To the hopper of the Davis-Standard 1.5 inch SSE hopper was added 70 parts BASELL PRO-FAX 7523 polypropylene resin and 30 parts CLARIANT white pigment concentrate. To the hopper of a Killion 0.75 inch SSE was added BASALL PRO-FAX 7523 polypropylene resin. The 2.5 SSE was running at a speed of 15 RPM, the 1.5 inch SSE was running at a speed of 50 RPM, and the 0.75 inch SSE was running at a speed of 100 RPM. The coextruded web emerged from the die through a shaped exit orifice and was subsequently quenched in a water bath, containing 1% wetting agent, having an actual water temperature of 83° F.

The resulting privacy film, similar to that shown in FIG. 3, was cut in the cross-web direction with a razor blade. With the use of optical microscopy, it was determined that the base sheet was 56 micrometer thick. The light directing elements had a center-to-center spacing of 340 micrometer, a height of 640 micrometer, a width of 130 micrometer, and a cant angle of 70°. The first region, lying distal to the first surface of the base sheet was 323 micrometer in height and consisted essentially of a blend of 96 parts BASELL PRO-FAX 7523 and 4 part black pigment concentrate. The second region proximate to the first surface of the base sheet was 190 micrometer in height and consisted essentially of 70 part BASELL PRO-FAX 7523 and 30 part CLARIANT white pigment concentrate. The third region lying immediately next to the first surface of the base sheet was 124 micrometer in height and consisted essentially of BASELL PRO-FAX 7523. The second region was sandwiched between the first and third regions.

Example 4

To the hopper of the Davis-Standard 2.5 inch SSE hopper was added 94 parts BASELL PRO-FAX 7523 polypropylene resin and 6 parts CLARIANT white pigment concentrate. To the hopper of the Davis-Standard 1.5 inch SSE hopper was added 94 parts BASELL PRO-FAX 7523 polypropylene resin and 6 parts CLARIANT white pigment concentrate. The 2.5 SSE was running at a speed of 28 RPM, the 1.5 inch SSE was running at a speed of 30 RPM. The coextruded web emerged through a shaped exit orifice and was subsequently quenched in a water bath, containing 1% wetting agent, having an actual water temperature of 83° F.

The resulting privacy film was cut in the cross-web direction with a razor blade. With the use of optical microscopy, it was determined that the base sheet was 145 micrometer thick. The light directing elements had a center-to-center spacing of 330 micrometer, a height of 670 micrometer, a width of 120 micrometer, and a cant angle of 55°.

What is claimed is:
1. A privacy film comprising
   a light transmissive, polymeric base sheet comprising a first polymeric material, the base sheet having opposing first and second surfaces, the second surface being substantially flat; and
   a plurality of freestanding light directing elements comprising a second polymeric material, wherein each element has a base, a height h, and a minor axis disposed along the height, wherein the elements protrude from the first surface of the base sheet, and wherein each element is disposed such that the minor axis of one element is substantially parallel to the minor axis of the next adjacent element and the base of one element is not joined with the base of the next adjacent element,
   wherein the elements are disposed on the base sheet at a cant angle greater than about 40° and less than about

85°, the cant angle being formed between the first surface of the base sheet and the minor axis of the element, and wherein the privacy film is used with documents.

2. The privacy film of claim 1, wherein elements have a center-to-center spacing from one element to the next adjacent element P, and wherein the h:P ratio of is from about 0.5 to 5.

3. The privacy film of claim 1, wherein each element has a width, measured perpendicular to the minor axis, greater than about 25 micron and less than about 750 micron.

4. The privacy film of claim 1, wherein at least one of the base sheet and light directing elements are substantially constant in their cross-section dimension.

5. The privacy film of claim 4, wherein at least one of the base sheet and the light reflecting elements further comprise a light reflecting material.

6. The privacy film of claim 5, wherein the light reflecting material is selected from the group consisting of titanium dioxide, zinc oxide, zinc sulfide, zinc phosphate, calcium carbonate, alumina, silica, antimony oxide, barium sulfate, lithopene, calcined kaolin, lead carbonate, magnesium oxide, and combinations thereof.

7. The privacy film of claim 6, wherein the elements further comprise a light absorbing material coated on their tips.

8. The privacy film of claim 5, wherein the amount of light reflecting material used in the base sheet and the light directing elements are substantially equal.

9. The privacy film of claim 1, wherein the first or second polymeric material is selected from the group consisting thermoplastic polymers and elastomers.

10. The privacy film of claim 9 wherein the thermoplastic polymer is selected from the group consisting of polypropylene, polyethylene, polystyrene, polycarbonate, polymethyl methacrylate, ethylene vinyl acetate copolymers, acrylate-modified ethylene vinyl acetate polymers, ethylene acrylic acid copolymers, nylon, polyvinylchloride, and combinations thereof 11. The privacy film of claim 1, wherein the first polymeric material is different from the second polymeric material.

12. The privacy film of claim 1, wherein the first polymeric material is substantially the same as the second polymeric material.

13. The privacy film of claim 1, wherein each element comprises a first region distal to and a second region proximate to the first surface of the base sheet.

14. The privacy film of claim 13, wherein the ratio of the height of the first region to the height of the second region is from about 3:0.1.

15. The privacy film of claim 13, wherein the first region comprises a light absorbing material and the second region comprises a light reflecting material.

16. The privacy film of claim 15, wherein the light reflecting material is selected from the group consisting of titanium dioxide, zinc oxide, zinc sulfide, zinc phosphate, calcium carbonate, alumina, silica, antimony oxide, barium sulfate, lithopene, calcined kaolin, lead carbonate, magnesium oxide, and combinations thereof; and wherein the light absorbing material is selected from the group consisting of carbon black, spinel black, rutile black, iron black, and combinations thereof.

17. The privacy film of claim 1 further comprising a light transmissive adhesive disposed on the second surface of the base sheet.

18. The privacy film of claim 17, wherein the adhesive is a repositionable adhesive.

19. The privacy film of claim 1, wherein the first or second polymeric material has a melt index of greater than about 0.5 and less than about 200.

20. The privacy film of claim 1, wherein each element has a tip, and the placement of the tip of one element, as taken along a line normal to the first surface of the base sheet, is next to the base of the next adjacent element.

21. The privacy film of claim 1, wherein each element has a tip, and the placement of the tip of one element as taken along a line normal to the first surface of the base sheet, overhang the base of the next adjacent element.

22. The privacy film of claim 1, wherein each element comprises an extension at its tip.

23. The privacy film of claim 1, wherein each element is non-constant in its cross section dimension.

24. The privacy film of claim 1, wherein the cant angle of each element is substantially constant across the film.

25. The privacy film of claim 1, wherein the cant angle of each light directing element is substantially similar to the next adjacent cant angle.

26. The privacy film of claim 25, wherein the cant angle varies from one portion of the film to another portion of the film.

27. The privacy film of claim 1, wherein the height of the elements are substantially similar.

28. The privacy film of claim 1, wherein the height of the elements are dissimilar.

29. The privacy film of claim 28, wherein the height of one element is about 75% to 95% of the height of the next adjacent element.

30. The privacy film of claim 1, wherein the light directing elements contain interruptions.

31. The privacy film of claim 30, wherein the interruptions are uniform, or non-uniform, or a combination thereof.

* * * * *

UNITED STATES PATENT AND TRADEMARK OFFICE
CERTIFICATE OF CORRECTION

PATENT NO. : 7,467,873 B2  Page 1 of 1
APPLICATION NO. : 11/250676
DATED : December 23, 2008
INVENTOR(S) : Graham M. Clarke It is certified that error appears in the above-identified patent and that said Letters Patent is hereby corrected as shown below:

Column 2

Line 28; after "coating" delete "." and insert -- ; --, therefor.

Line 56; delete "paper," and insert -- paper --, therefor.

Column 4

Line 9; delete "spinal" and insert -- spinel --, therefor.

Line 9; delete "retile" and insert -- rutile --, therefor.

Line 40; delete "119," and insert -- $1_{119}$, --, therefor.

Column 8

Line 4; delete "BASALL" and insert -- BASELL --, therefor.

Column 9

Line 38; Claim 10, after "thereof" insert -- . --.

Signed and Sealed this
Twenty-seventh Day of November, 2012

David J. Kappos
*Director of the United States Patent and Trademark Office*